United States Patent [19]

Pierce

[11] Patent Number: 5,684,286
[45] Date of Patent: Nov. 4, 1997

[54] DEVICE FOR OPTICALLY READING A SYMBOL ON A FORM BY SHINING RADIATION THERETHROUGH, AND RELATED METHOD

[75] Inventor: David R. Pierce, Thousand Oaks, Calif.

[73] Assignee: Computer Based Controls, Inc., Agoura, Calif.

[21] Appl. No.: 547,606

[22] Filed: Oct. 24, 1995

Related U.S. Application Data

[63] Continuation of Ser. No. 201,815, Feb. 25, 1994, abandoned.

[51] Int. Cl.⁶ .................................................. G06K 7/10
[52] U.S. Cl. ................................... 235/454; 235/462
[58] Field of Search ........................ 235/454, 456, 235/469, 462, 494

[56] References Cited

U.S. PATENT DOCUMENTS

| | | | |
|---|---|---|---|
| D. 261,007 | 9/1981 | Passer et al. | D18/26 |
| 3,163,758 | 12/1964 | Treacy | 250/271 |
| 3,453,419 | 7/1969 | Torrey | 235/494 X |
| 3,529,133 | 9/1970 | Kent et al. | 235/61.11 |
| 3,898,434 | 8/1975 | Bigelow | 235/494 |
| 3,949,363 | 4/1976 | Holm | 235/462 X |
| 4,074,114 | 2/1978 | Dobras | 235/463 |
| 4,096,992 | 6/1978 | Nojiri | 235/462 |
| 4,408,120 | 10/1983 | Hara | 235/462 |
| 4,408,121 | 10/1983 | Galatha | 235/494 |
| 4,608,489 | 8/1986 | Ramsey | 235/462 |
| 4,625,275 | 11/1986 | Smith | 364/401 |
| 4,629,876 | 12/1986 | Kubota | 235/473 |
| 4,794,239 | 12/1988 | Allais | 235/462 |
| 4,864,111 | 9/1989 | Cabili | 235/437 |
| 4,864,112 | 9/1989 | Imai et al. | 235/463 |
| 4,900,907 | 2/1990 | Matusima | 235/472 |
| 4,914,623 | 4/1990 | Hudson | 364/900 |
| 4,945,214 | 7/1990 | Hancock et al. | 235/456 |
| 4,963,726 | 10/1990 | Checchetti | 250/208.01 |
| 4,973,829 | 11/1990 | Ishida et al. | 235/462 |
| 5,122,645 | 6/1992 | Saeki et al. | 235/462 |
| 5,157,243 | 10/1992 | Ramsey | 235/376 |
| 5,198,649 | 3/1993 | Brooks | 235/462 |
| 5,268,563 | 12/1993 | Takenaka | 235/462 |
| 5,521,371 | 5/1996 | Hotta | 235/487 |

FOREIGN PATENT DOCUMENTS

A0088698  4/1989  Japan.

*Primary Examiner*—Donald T. Hajec
*Assistant Examiner*—Karl Frech
*Attorney, Agent, or Firm*—Pretty, Schroeder & Poplawski

[57] ABSTRACT

A reader for machine reading a symbol printed on a document. The light source shines light through a form at the location of a symbol printed on the form, and onto an array of light sensitive cells. This casts an image of light and shadow on the array. The array generates a signal in response to that image, which signal is processed to determine the information carried by the symbol. A writer such as a computer printer may also write to the document, and the information written to the document can be stored in a computer in conjunction with the information (such as an identification number) read from the symbol. Also, the method of encoding an identification number in a symbol, and decode it with the reader.

16 Claims, 3 Drawing Sheets

DEVICE FOR OPTICALLY READING A SYMBOL ON A FORM BY SHINING RADIATION THERETHROUGH, AND RELATED METHOD

This application is a continuation, of application Ser. No. 08/201,815 filed Feb. 25, 1994, now abandoned.

BACKGROUND OF THE INVENTION

A vast number of documents are issued every day on pre-printed forms. Those forms often have identification numbers or symbols printed on them so that when information is written onto the form, that particular form can be identified and the information recorded on that form stored and retrieved by reference to its identification number. Common examples are personal checks. The blank forms may he identical except for the check numbers. The check register is organized by check number, and the date, amount and payee are recorded according to check number. Likewise a money order may he written onto a pre-printed form with an identification symbol on it which represents the identification number of the form. As more and more of these documents, including personal checks, are being written onto pre-printed forms by computer printers, there is a great need for an inexpensive and reliable system for machine reading an identification symbol printed on those forms.

If the identification numbers of those forms are manually recorded at the time the forms are filled out, the process is cumbersome, time consuming, expensive and prone to inaccuracy due to human error. Therefore a system of machine reading and entry of the form identification is preferable.

One system of machine reading an identification symbol is the bar code system which uses a machine to read a bar code printed on a document. Such systems are often designed for use in identifying documents or packages, such as mail, where the reader must be able to read the bar code independent of the relative position of the bar code and the reader. While satisfactory for their intended purposes, for some applications, such bar code reading systems are less than ideal because the reader generally requires a lens to focus a reflected light beam onto the bar code, onto the sensor, or onto both, often requires the use of a coherent light source, and generally requires movement between the light source and the code, usually generated by a rapidly moving part such as a spinning mirror or spinning hologram. Each of these requirements adds to the expense of manufacture and leads to errors during the use of such a reader. In addition to these shortcomings with the reader, the symbol used in such a system generally must be printed to precise specifications and therefore may be relatively expensive to print and subject to error.

Many systems exist in the printing of information on forms to generate documents where the forms are similar to each other and their position and movement relative to a mechanical device, for example a tractor-type printer, is predictable. Mounting a sensor on such a device would eliminate the need for a system such as a bar code system that allows "reading" the code regardless of the relative position of reader and the document, thus avoiding the cost and inaccuracy of such a system.

SUMMARY OF THE INVENTION

This invention is directed to an inexpensive and highly reliable apparatus and method for machine reading symbols printed on forms. It comprises a device for machine reading a symbol on a document which document is at least partially translucent to incident radiation and which has markings on it in the form of a symbol. The markings are transparent to the incident radiation to a different degree than the unmarked portion of the form. The reader has a radiation source such as a light source which shines radiation through the document at the location of the symbol and onto a sensor such as an array of light sensitive cells. The array generates a signal in response to the radiation falling on it.

The shape of a symbol printed on the form varies depending on the information (such as an identification number) encoded in that symbol. The pattern of light and dark created when light shines through that symbol therefore varies, and the signal generated by the light falling on the array varies in accordance with the shape of the symbol. Therefore that signal may be processed to decode any information encoded in the symbol.

The symbol may be a combination of several patterns, for example, patterns comprising parallel areas of pigmented bars and unpigmented spaces. Each pattern may represent a digit. When several such patterns are aligned end-to-end directly abutting each other, they may create, for example, a symbol that represents a multi-digit number.

The form is advanced, smoothly or in a step-wise fashion, between the sensor and the light source. As the symbol printed on the form is passed between the sensor and the light source, the signal from the sensor is periodically sampled, and the signal so sampled is processed to read each pattern. The signal representing each pattern might be sampled several times, and each such signal processed to decode the pattern.

Each pattern is decoded to determine its value, e.g. a digit, and the value of the patterns that make up the symbol are combined to determine the information encoded in the symbol, e.g. a multi-digit identification number. If the signal representing each pattern is read several times, only the most reliable reading is used to combine with other readings to determine the information stored in the symbol. That information may then be recorded in conjunction with the information printed on the form for later retrieval.

The method of the invention comprises the use of the document reader described above to read symbols printed on the form.

The reader of the invention and its use thus allows for an inexpensive machine reader to read symbols printed on forms.

The reader of the invention and its use provides for a highly reliable means of machine reading symbols printed on forms.

The reader of the invention and its use provides for machine reading a symbol on a form while the form is being advanced through a printer.

The reader of the invention and its use provides for machine readings of a pattern while the pattern is stationary relative to the reader.

The reader of the invention and its use provides for combining multiple patterns to store and read information in a symbol.

The reader of the invention and its use provides for a machine reader which may be lens-free.

The reader of the invention and its use provides for the generation of an identification signal that may be processed in a manner which produces a highly reliable result.

These and other objects and advantages of the invention and the manner of achieving them will be further explained

BRIEF DESCRIPTION OF THE DRAWINGS

FIG. 1A is an elevated view of the linear array of light sensitive cells;

FIG. 5 shows the patterns used in a preferred embodiment;

FIG. 6 is a representation of the patterns shown in FIG. 5 combined to form an identification symbol.

DETAILED DESCRIPTION

Figure 1:
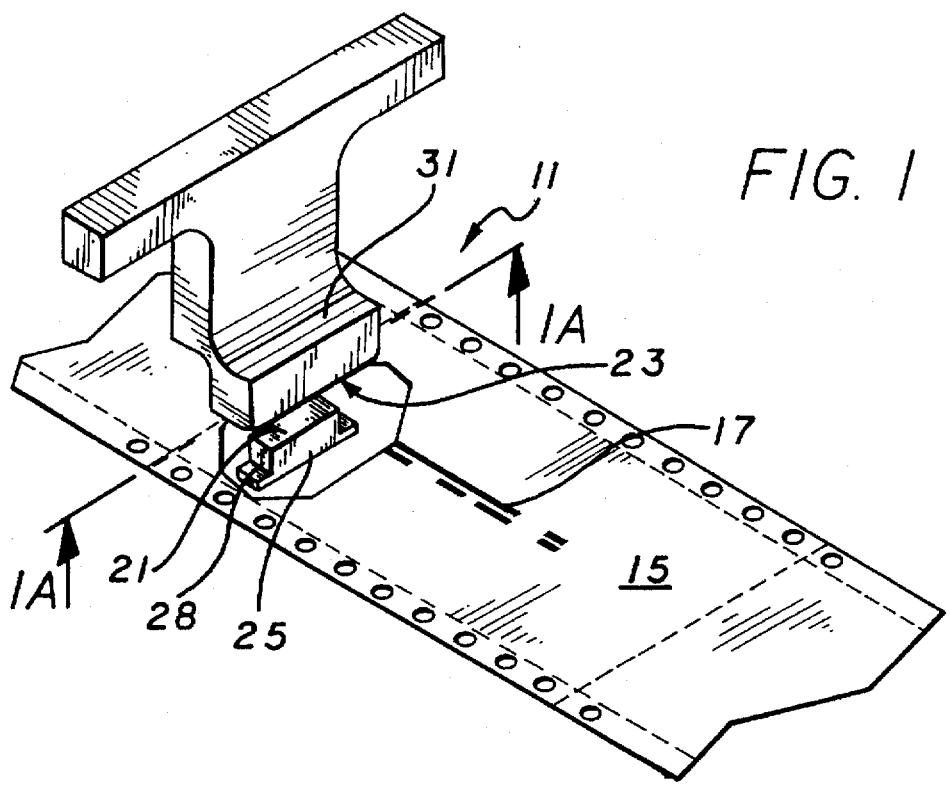
FIG. 1 is a perspective top view of an embodiment of the invention including an optical reader and a form having a symbol printed thereon, the form shown partially cut-away.
Figure 2:
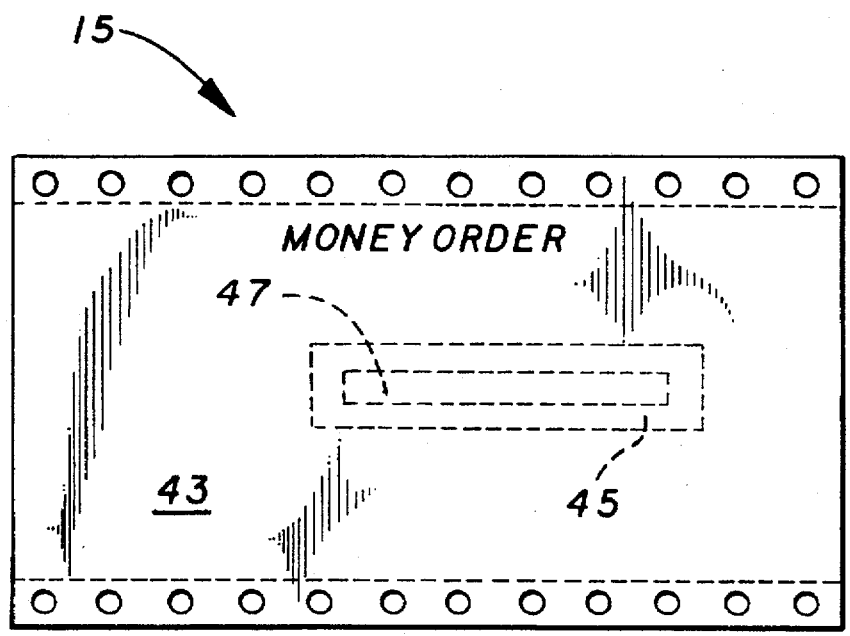
FIG. 2 is a top view of a form for use in the invention.

As is shown in the drawings for purposes of illustration, the embodiment depicted uses an optical image detector (11) incorporated into a tractor-type printer mechanism (13) for use with forms (15) having an identification symbol (17) printed on each form. The form is advanced along the paper path of the printer and information is printed onto it by the print head (19). For example, if the form is a money order, the date, amount and payee may be printed onto the previously blank form. As the form is advanced along the paper path, the identification symbol printed on it is passed through the optical image detector, a signal is generated. That signal may then be processed to read and decode the information encoded into the symbol, and that information may then be recorded in conjunction with the other information printed on the form.

The Optical Sensor

The optical image detector (11) comprises a light source (21) and a light sensing array (23) spaced apart a sufficient distance for a form to be passed between them. The light source may be, for example, a light emitting diode. The light emitting diode is mounted in a housing (25) which holds it near the paper path, for example, just below the lower surface of the paper path. It holds the LED so that the LED directs light (27) toward the light sensing array. The housing for the LED may also incorporate a spring (28) for urging the form into close proximity with the light sensing array. The LED generates light (29) of sufficient intensity so that when it is transmitted through the form, it is sufficiently intense to be detected by the light sensing array.

The light sensing array (23) is mounted in a housing (31) which holds the array near the paper path in the tractor-type printer directly opposite the light source, for example, just above the upper surface of the form (15) as it advances into the tractor-type printer. The sensor may be, for example, a charge coupled device ("CCD") having 64 light sensitive cells (32) in a single file linear array, each cell being ⅛ mm square. A reference voltage (33), for example 5 volts, is applied to this CCD. The CCD array may be contained in a an electronic chip which also has self-contained clocking circuitry which may be utilized in determining the period of sampling of the signal generated by the CCD. A commercially available example of a chip of the type described here is the TSL 214 manufactured by Texas Instruments.

Each cell within the array generates a signal whose intensity varies in relation to the amount of light falling on the cell. The signal of each cell may be combined with the others from the array to form an analog signal (37) representing the pattern of light intensity falling on the entire array. Therefore, as the form is passed between the LED and the CCD, a signal is generated that represents the pattern of light intensity transmitted through the form. The signal is sampled periodically at periods determined by the CCD clock generator (39), which as mentioned above, may be contained in the chip incorporated into the CCD. The signal sampled will represent the pattern (41) interposed between the LED and CCD at the time of the sampling, and may be processed to decode any information stored in that pattern.

The Form

The form (15) used in the machine reader of this embodiment is a pre-printed paper form such as a blank money order (43). The substance that is used for the form may be safety paper or the like to deter forgery, plain paper, or any substance, provided whatever is used is sufficiently translucent to light (29) from the LED (27) that sufficient light is transmitted therethrough to generate a signal when falling upon the cells (32) of the CCD array. The indita printed on the form, other than the symbol (17) is not critical, except that it may not obstruct light passing through the symbol. This may be accomplished, for example, by having a zone (45) on the form including an area (47) wherein the symbol is located, and having the zone being slightly larger than the symbol, the zone being entirely blank except for the symbol.

Each form has a symbol (17) printed on it. The symbol in this embodiment is comprised of parallel pigmented areas (49) and unpigmented areas (51). The pigmented areas of the symbol are less transparent to light than are the unpigmented areas so that when light shines through the form (15) at the location of the symbol and onto the light sensing array (23), the symbol acts essentially as a mask so that a sharp image of light and shadow is cast onto the array even without a lens to focus the image. The intensity of the light falling on each cell of the array varies depending on whether the portion of the symbol between the cell and the (21) is pigmented or not. In turn, the cells generate a signal that varies depending on the intensity of light falling on each cell. When all the signals of the cells are combined, the resultant aggregate signal may be processed to determine the information encoded in that portion of the symbol.

The Symbol

The symbol (17) printed on the form may be any appropriate marking which may act as a mask to create an image of light and shadow on the sensor when the symbol is moved between the light source and the sensor. The symbol described here which has been found useful is made by combining a plurality of patterns (53) oriented end to end, directly abutting one another in vertical alignment. In this embodiment, there are 11 unique patterns, with one representing a start code (55) and one each representing the numbers zero (57) through nine (59). These patterns are in the form of a series of parallel stripes which are either bars (pigmented stripes) (49) or spaces (unpigmented stripes) (51). When a plurality of these patterns are oriented in end-to-end abutting juxtaposition, the resultant symbol represents a sequence of digits which together encode a multi-digit number (see generally FIG. 6). While always the same in any particular application, for different applications, the precise size limitation of the bars and spaces is not critical to the invention except that it must create a variable pattern of light and dark that carries any information within the width that falls on the light sensor. In the embodiment depicted here, the bars are slightly different in width than the spaces for ease of printing. The width dimensions of the bars and spaces are set out in the table below:

| Patterns Beginning with Opaque Regions on Left Boundary | | | | |
|---|---|---|---|---|
| DIGIT | OPAQUE | CLEAR | OPAQUE | CLEAR |
| 0 | Left boundary through 0.050" | 0.050" through right boundary | | |
| 1 | Left boundary through 0.050" | 0.050" through 0.094" | 0.094" through 0.144" | 0.114" through right boundary |
| 2 | Left boundary through 0.113" | 0.113" through right boundary | | |
| 4 | Left boundary through 0.050" | 0.050" through 0.094" | 0.094" through right boundary | |
| 9 | Left boundary through 0.113" | 0.113" through 0.156" | 0.156" through right boundary | |
| START CODE | Left boundary through 0.081" | 0.081" through 0.125" | 0.125" through right boundary | |

| Patterns Beginning with Clear Regions on Left Boundary | | | | |
|---|---|---|---|---|
| DIGIT | CLEAR | OPAQUE | CLEAR | OPAQUE |
| 3 | Left boundary through 0.106" | 0.106" through right boundary | | |
| 5 | Left boundary through 0.044" | 0.044" through right boundary | | |
| 6 | Left boundary through 0.075" | 0.075" through 0.125" | 0.125" through right boundary | |
| 7 | Left boundary through 0.044" | 0.044" through 0.094" | 0.094" through 0.153" | 0.153" through right boundary |
| 8 | Left boundary through 0.153" | 0.153" through right boundary | | |

The patterns which are used in this embodiment which represent a start code and the digits zero through nine are all shown in FIG. 5.

The length of individual patterns (53) is determined in a manner appropriate for the paper movement and signal sampling employed. For example, the patterns depicted are used in a tractor-type printer (61) that advances the paper in steps of 0.110 inches. The signal generated by the sensor is sampled after each advance of the tractor-feed mechanism. The patterns are each 0.219 inches long. By selecting a pattern length of 0.219 inches, the signal may be sampled in a manner to assure that the signal selected does not represent a portion of the pattern which is near the border (63) between two adjacent patterns. This is desirable since it enhances the reliability of the sensor reading. This is explained in greater detail in the next section.

The Signal Processing

Figure 3:
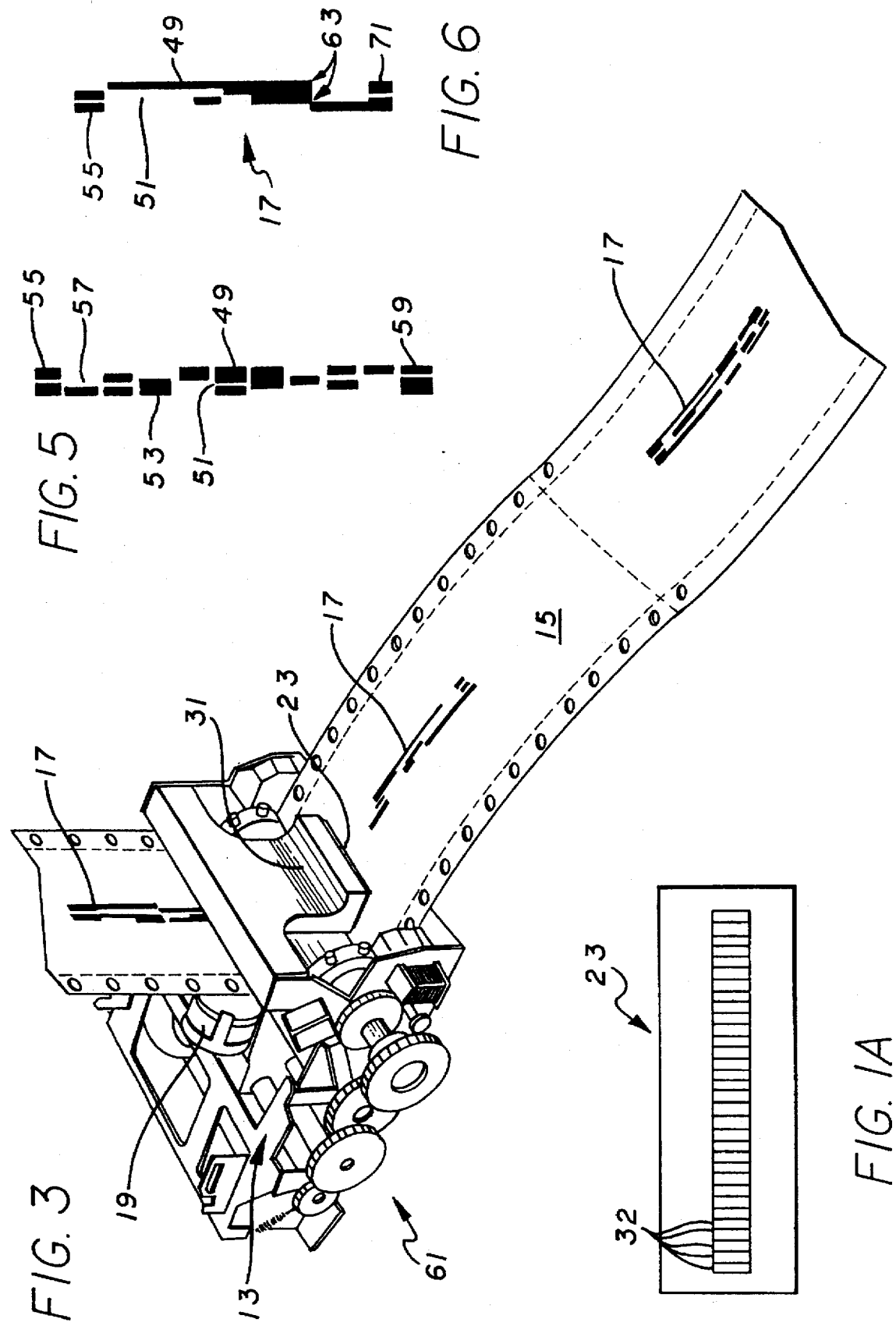
FIG. 3 is a perspective top view of the machine reader and forms of the invention mounted in a tractor printer.
Figure 4:
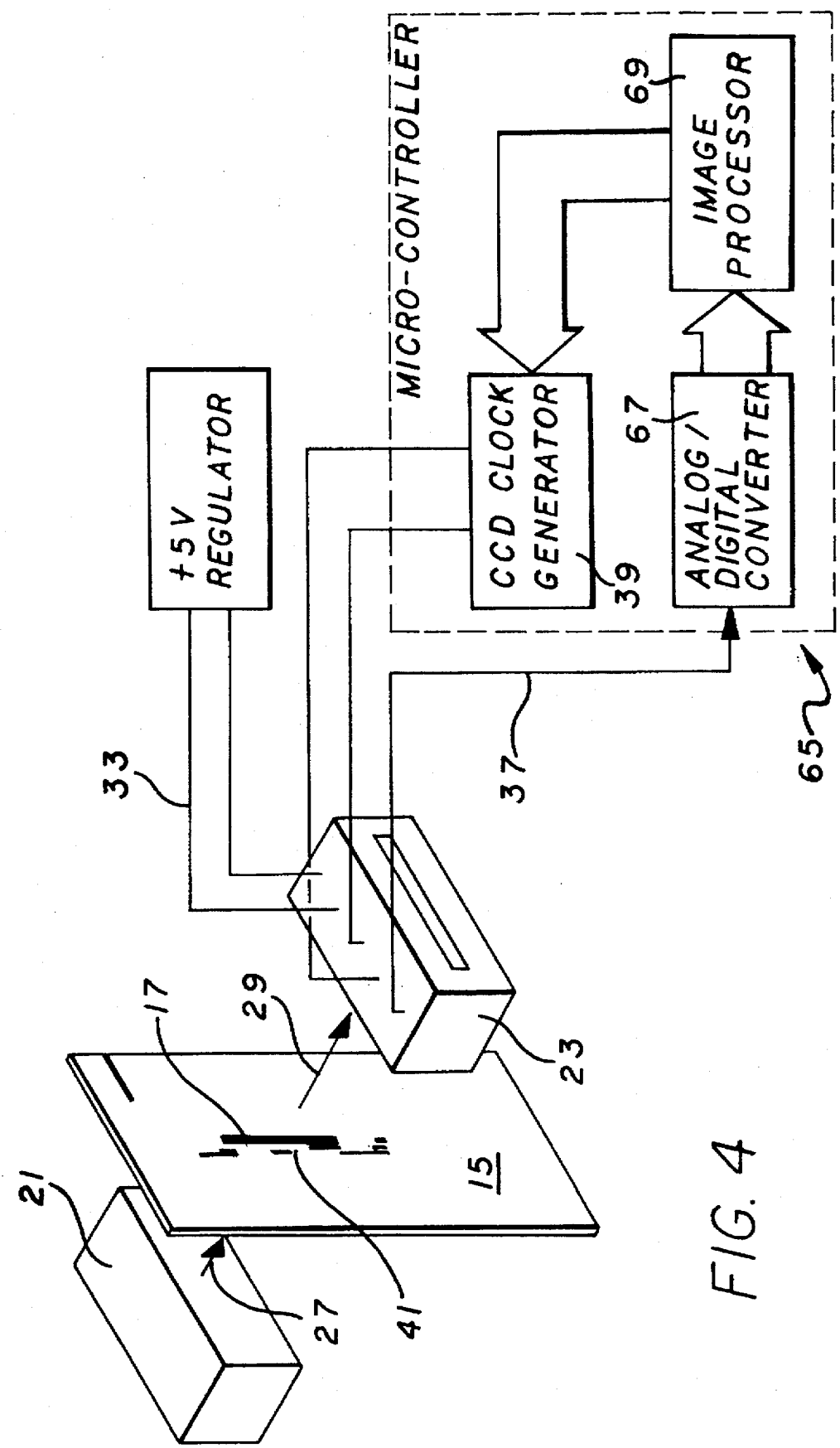
FIG. 4 is a diagrammatic representation of the invention with flow charts indicating the signal processing of a preferred embodiment.

As an overview, and with reference to FIGS. 3 and 4, the signal (37) generated by the array (23) is sampled periodically at times dictated by the CCD clock generator (39), and the signal so sampled is processed by the signal processor. The signal generated by the array is an analog signal. That signal is converted by an analog/digital converter (67) into a digital signal. That digital signal is then examined by the image processor (69) to determine whether it represents a start code (55). If no start code is detected, no action is taken. If a start code is detected, then a certain number of the signals subsequently sampled are processed further. For example, if the number of digits in a multi-digit number is known, and a start code is detected, then the subsequent readings are processed to determine each subsequent digit until all the digits in the number are determined; if the form contains a ten-digit identification number, then ten digits subsequent to the start code are determined.

The identification of the image of light and dark, and the assignment of a value to that image is performed by the image processor (69). The precise method of determining the value of each digit is done according to the computer program which is set out as an Appendix, submitted herewith.

High reliability is a valued feature, and several methods of assuring high reliability are incorporated into the signal processing of this embodiment. One such method is to read each pattern twice, decide which reading is most likely to be reliable, and to select that reading to be used to determine the digit represented by the pattern.

One method of doing this is by analyzing the first reading after a start code (55) is detected. That next reading will either be another start code, a nonsense or ambiguous reading (generally indicating that the sensor is positioned over a boundary between patterns (63)), or an identifiable digit code. The proper readings to be relied upon thereafter are determined as described here.

The signal (37) generated by the optical sensor array (23) is most likely to be ambiguous or nonsensical if the optical sensor is reading the symbol at a boundary between two patterns (63). In order to minimize this likelihood of reliance on such a signal, a method of selecting a preferred signal is used based upon the length of each advancement of the printer. The tractor-feed printer advances the paper by a length of 0.110 inches each step. The start code is 0.163 inches long, slightly more than 1 paper advance in length; each pattern representing a digit is 0.219 inches long, slightly less than 2 paper advances in length. After the signal processor first detects a start code, it samples and processes the signal after each subsequent tractor-feed advance, i.e., after the form is advanced 0.110 inches. If the second reading is also a start code, then that reading is 0.110 inches from the initial reading and thus near the boundary between the start code and the first pattern representing a digit. The next reading (the third reading) will be 0.110 inches farther along and thus not near the boundary. This reading, therefore, is the preferred reading in determining the digit encoded in that first pattern since it is deep into the pattern and not near a border between patterns.

A reading after the next advance (the fourth reading) will be at a place close to the border between the first and second patterns since each pattern is 0.219 inches long. It is therefore not the preferred reading for the second pattern. The following reading will be preferrable. Thus, in this example, the odd numbered readings (first, third, fifth, etc.) beginning with the first reading that is a digit, are the preferred readings.

If the first reading is a start code, and the second reading is a nonsense or ambiguous reading, the second reading is likely on the border between the patterns for the start code and the first digit. The paper advance of 0.110 inches will position the reader deeply into the first pattern. Each successive two advances will likewise position the reader over a pattern for a digit deep within (i.e., far from the border of) a pattern. In this case, the more reliable readings will be the even numbered readings after the start code is first detected.

If the first reading after the start code is an identifiable digit, then the reader at the time of that second reading is positioned somewhere within the first half of the pattern but deeply enough into the pattern to generate a readable signal. Two additional advances will position the reader even more deeply within the next pattern since two advances move the symbol 0.220 inches and the pattern is only 0.219 inches long. In this instance, as in the first example, the preferred readings will be the odd numbered readings beginning with the first reading after the start code that generates a signal that is "read" as an identifiable digit.

The preferred readings of each digit (e.g., readings 1, 3, 5, etc.) are stored. The values determined for the alternate readings (e.g., readings 2, 4, 6, etc.) are stored separately. The values of each of the preferred readings are then combined to form a multi-digit number (e.g., 1, 3, 5, . . . ). If, for any reason, the value of one of the preferred readings is nonsensical, then the image processor substitutes the alternative reading of that pattern (e.g., if the preferred reading for the third digit is nonsensical, the alternative reading for the third digit is substituted). Likewise, if any of the alternative readings are nonsensical, the preferred reading for that digit may be used.

Once a preferred list of digits and an alternative list of digits is determined, a check sum is used. The check sum is employed as follows. The last pattern in a symbol (71) represents a digit that is not itself part of the multi-digit identification number. Rather, that pattern is selected to represent a digit which, when added to all the other digits represented in the symbol, results in a sum that is evenly divisible by nine. Therefore, upon completion of reading the last digit in the symbol, the image processor sums all the digits of the preferred list and divides the sum by nine. If the sum is evenly divisible by nine, the multi-digit identification number is assumed to be correct and the determination is complete. That number is used (e.g., stored as the form identification number).

If the sum is not evenly divisible by nine, then the image processor will sum all the digits in the alternative list. If that sum is evenly divisible by nine, then that list of digits is assumed to be correct, and is used to form the multi-digit identification number. If not, one final attempt is made to determine the value of that identification number.

The image processor has an expected identification number for each form based on the previously determined number. If neither of the check sums are evenly divisible by nine, the image processor examines the preferred value for the last three patterns (including the check sum pattern). If any two of these digits are the digits expected by incrementing the previously determined value by one, then the image processor assigns as the form identification number the expected number (usually the previously identified number plus one). If not, the image processor may signal the operator in some appropriate manner.

This check sum procedure results in a determination in a high percentage of attempts and with a high degree of reliability.

In operation, forms (15) with an identification symbol (17) on them are loaded into a printer (61) which incorporates an optical image detector (11). (If they are in sequence, the initial form number is input into a micro-controller (65) such as a computer. This number is incremented by one each time a form is advanced. The micro-controller thus has an expected identification number for each form.) Each form, as needed, is advanced through the printer in step-wise fashion by a tractor-feed mechanism and passes between the light source (21) and the light sensing array (23). As the form is advanced, the symbol (17) moves between the light source and the array in close proximity to the array, creating an image of light and shadow that represents the pattern printed on the form. The array generates a signal in response to the light falling on it. The signal is sampled after each step-wise paper advance, and the signal is decoded by the image processor (69) to determine the value of the digit encoded in the pattern (53). The number of digits appropriate for the multi-digit number are combined to determine that number as encoded in the symbol. The number so determined is then stored in conjunction with the information subsequently printed on that form for later retrieval and use. For example, if the form is a money order, the payee, amount, date, and location of the issuance, and the like, can be stored and later retrieved by reference to the identification number encoded in a symbol printed on the form.

While specific embodiments of the invention have been described in detail, it will be appreciated by those skilled in the art that various modifications to the structure and use of the disclosed invention may be made in light of the overall teachings of the disclosure, without departing from the scope of the invention as defined by the appended claims.

VARAM-34559                    - 16 -

APPENDIX

```
;****************************************************
;*                                                  *
;* { V28SENSE.asm }                                 *
;*                                                  *
;*          VAR280 POS Controller                   *
;*            VARASTRIP SENSOR routines             *
;*                                                  *
;* Started March 8, 1991 by David R. Pierce         *
;*                                                  *
;*         VARAMETRIX                               *
;*         CORPORATION                              *
;*                                                  *
;*  SOURCE FILE DESIGNED FOR USE WITH M50734SP      *
;*    MITSUBISHI MICROCOMPUTER  LANGUAGE ASM740     *
;****************************************************

;CURRENT 2-9-94

;       Buzzer routines

NOLIST
        INCLUDE (CONSTANT.INC)
        INCLUDE (V28HEAD.INC)
        INCLUDE (V28ZPG.INC)

ASEG

T3              EQU     $E1
TW              EQU     $FC
PRE3            EQU     $E0
ADCON           EQU     $E9
ADSR            EQU     $EA
P1              EQU     $F3
P3              EQU     $EE
ICON2           EQU     $FE

LIST

ENT     SENSOR,TIKSENS/
        ENT     SENCONS/
        ENT     TSKERBF/
        EXT     SYSGMEM/
        EXT     HEXASCI/
        EXT     MOTOROF/
        EXT     PRCSET/
        EXT     PRCCLR/
        EXT     ONELINE/
        EXT     CHKPSTA/

CSEG

SENCONS:        DB      $0C,$F3,$01,$80,$00
```

VARAM-34559               - 17 -

```
        TIKSENS: LDA    TSKCONF+18      ;GET LAST INTEGRATION TIME
                 STA    PRE3            ;LOAD TIMER 3 PRESCALE
                 STA    SENSTMP+10
                 LDM    #$5C,T3         ;LOAD TIMER 3 TO 100
 5               LDA    #$00
                 STA    SENSBYT         ;CLEAR BYTE COUNTER
                 STA    SENSFLG         ;CLEAR FLAG
                 STA    SENSPNT         ;CLEAR LSB POINTER
                 STA    SENBYTB
10               STA    SENSTMP+7       ;CLEAR RECV NUM POINTER
                 STA    SENSTMP+3       ;CLEAR IRQ TRIGGER
                 STA    SENSTMP+8       ;CLEAR LF COUNTER
                 STA    SERCNT          ;CLEAR CONSEC ERR COUNTER
                 LDA    TSKCONF+17      ;OFFSET TO START OF CODE
15               STA    SENSTMP+4       ;PLACE IN ACTIVE VARIABLE
                 CLB    IT3RBT,ICON2    ;CLEAR OLD INTERRUPT
                 SEB    IT3EBT,ICON2    ;ENABLE T3 INTERRUPT
                 JSR    SYSGMEM         ;GET A BUFFER
                 STA    SENSPNT+1       ;SAVE BUFFER IN POINTER
20               JSR    TSKERBF         ;WRITE TSKCONF TO ERR BUF
                 SEB    1,SENERBF       ;PWR UP/PAPER EMPTY BIT
                 JSR    EARNUM
                 BCC    TIKSEN1
                 LDM    #$10,SENSTMP+3  ;WAIT 16 TIME PERIODS
25               SEB    SENSAVE,SENSFLG
                 SEB    SENKEEP,SENSFLG
                 SEB    SENSAGN,SENSFLG
                 LDA    TSKCONF+15
                 AND    #$0F
30               STA    SENBCDB         ;PRIME CHECKSUM DIGIT
        TIKSEN1: RTS

SENSA:   SEB    SENCLK,P1
                 CLB    SENCLK,P1
                 INC    SENSPNT
35               LDA    SENSPNT
                 CMP    #64
                 BNE    SENSA
        SENSB:   CLB    SENREAD,SENSFLG
                 RTS

40      SENSC:   LDA    TSKCONF+18      ;GET LAST INTEGRATION TIME
                 STA    PRE3            ;LOAD TIMER 3 PRESCALE
                 CLB    1,SENSPAP
                 SEI
                 SEB    SENCLK,P1
45               CLB    SENCLK,P1
                 LDM    #$00,ADCON
                 NOP
                 NOP
        SENSD:   SEB    SENCLK,P1       ;SET CLOCK
50               CLB    SENCLK,P1       ;CLEAR CLOCK
                 INC    SENSPNT         ;BUMP POINTER
                 LDA    SENSPNT         ;CHECK IF AT END
                 CMP    #63
                 BNE    SENSD
```

VARAM-34559                          - 18 -

```
                CLB     SENREAD,SENSFLG
                CLB     SENENAB,SENSFLG
                SEB     3,SENSPAP            ;MARK DETERMINED PAPER
                LDA     ADSR
 5              CLC
                ADC     #08                  ;ADD 8 TO IT
                BCS     SENSH                ;MUST NOT HAVE PAPER
                SEC
                SBC     TSKCONF+19
10     SENSH:   BCC     SENSK                ;PAPER PRESENT SKIP
                BBC     3,SENERBF,SENSI      ;SKIP NOT SET LST TIME TO
                SEB     2,SENSPAP            ;MARK WE HAVE NO PAPER
                SEB     1,SENERBF            ;SET POR/PAPER EMPTY BIT
                CLB     3,SENERBF            ;CLEAR FLAG
15              BRA     SENSJ                ;SKIP

SENSI:   SEB     3,SENERBF            ;SET TO CHECK NEXT TIME
       SENSJ:   PLA
                AND     #$FE
                PHA
20              SEC
                SBC     TSKCONF+19           ;CHK TO LST MAX WHITE VAL
                BCC     SENSG                ;SKIP IF NOT WHITER
                PLA
                STA     TSKCONF+19           ;SAVE AS MAX WHITE VALUE
25
                CLI
                RTS

SENSK:   CLB     3,SENERBF            ;CLEAR PAPER FLAG
       SENSG:   PLA
30              CLI
                RTS

SENSOR:  LDM     #$50,TW              ;RESET WATCHDOG
                BBC     SENREAD,SENSFLG,SENSO2  ;EXIT NOT READING
                BBC     SENENAB,SENSFLG,SENSA   ;NOT SAVE SKIP A/D
35              BBS     1,SENSPAP,SENSC         ;READY PAPER STAT
                LDA     #$28
                STA     PRE3                 ;LENGTHEN INTEGRATE TIME
       SENSO1B: BBC     2,ADCON,SENSO1A      ;SKIP NOT CONVERTED
                LDA     ADSR                 ;GET A/D VALUE
40              LDY     #00
                SEB     SENCLK,P1            ;SET CLOCK HIGH
                STA     (SENSPNT),Y          ;SAVE
                CLB     SENCLK,P1            ;DRIVE CLOCK LOW
                STY     ADCON                ;START CONVERSION
45              INC     SENSPNT              ;BUMP POINTER
                LDA     SENSPNT
                CMP     #64
                BNE     SENSO1A
                CLB     SENREAD,SENSFLG
50              SEB     SENDECO,SENSFLG      ;SET DECODE BIT
                LDA     #00
                STA     SENSPNT
```

VARAM-34559                              - 19 -

```
                  LDA     TSKCONF+18
                  STA     PRE3                  ;RESTORE INTEGRATION TIME
                  RTS

SENSO1A:  LDM     #$50,TW               ;RESET WATCH DOG
  5               BRA     SENSO1B               ;REENTER LOOP

SENSO2:   BBC     SENDECO,SENSFLG,SENSO3    ;SKIP NO DECODE
        FLG
                  JSR     SENSTRN               ;DO TRANSITION CHECK
                  JSR     CHKPSTA               ;DO PRINTER STUF
 10               JSR     SENSSTR               ;STORE IN BUFFER
                  JSR     CHKPSTA               ;DO PRINTER STUF
                  CLB     SENDECO,SENSFLG       ;CLEAR DECODE FLAG
                  CLB     SENENAB,SENSFLG       ;CLEAR ENABLE
        SENSO3:   BBC     SENLOAD,SENSFLG,SENSO4    ;SKIP FORCE LF
 15               BBS     2,STATFLG,SENSO4      ;STILL LINE FEEDING
                  SEI
                  TST     SENSTMP+3
                  BNE     SENSO5                ;COUNTING DOWN SKIP
                  BBS     SENENAB,SENSFLG,SENSO5    ;SKIP GOT IT
 20               LDM     #1,SENSTMP+3          ;WAIT 6 PERIODS
        SENSO5:   CLI
        SENSO4:   RTS

SENSTRN:  LDY     #00
        SENSTR2:  LDA     (SENSPNT),Y           ;GET VALUE FROM BUFFER
 25               LDM     #64,SENSPNT           ;OFFSET TO STORAGE BUFFER
                  STA     (SENSPNT),Y           ;SAVE IN STORAGE BUFFER
                  LDM     #00,SENSPNT           ;OFFSET TO VALUE BUFFER
                  INY                           ;BUMP INDEX
                  CPY     #64                   ;DO ALL 64 BYTES
 30               BNE     SENSTR2               ;BRANCH UNTIL DONE
                  JSR     FRSTDIF               ;FIRST DIFFERENCE DATA
                  LDX     #62                   ;DO ENTIRE ARRAY
                  LDY     #01                   ;START AT 1 PLUS BEGINNING
                  JSR     MAXMIN                ;CALCULATE MAX MIN VALUES
 35               BCS     SENSTR6               ;NO TRANSITIONS EXIT
                  BBS     SENSAVE,SENSFLG,SENSTR1   ;SKIP STARTED
                  LDY     #01                   ;START AT 1 PLUS BEGINNING
                  LDX     #00                   ;SET NOT OVER WRITE ARRAY
                  JSR     BLACKS                ;FIND START OF BLACK
 40               BCS     SENSTR4               ;ERROR EXIT
                  CPY     #28                   ;CHK IN CORRECT POSITION
                  BPL     SENSTR4               ;ERROR EXIT
                  JSR     CALSTRT               ;CALC THE START POINT
                  BCS     SENSTR4               ;ERROR EXIT
 45     SENSTR1:  JSR     SENSCON               ;CONVERT TO IDEAL IMAGE
                  RTS

SENSTR4:  LDY     #$3F                  ;ERROR FLAG
                  RTS

SENSTR6:  LDY     #63
 50               LDA     (SENSPNT),Y
                  INY
                  STA     (SENSPNT),Y           ;SAVE ABOVE BUFFER
```

VARAM-34559                    - 20 -

```
                BRA     SENSTR4         ;EXIT

FRSTDIF:  LDY     #00             ;START WITH FIRST VALUE
      FRSTDI1:  SEC
                INY
   5            LDA     (SENSPNT),Y     ;GET BYTE n+1
                DEY
                SBC     (SENSPNT),Y     ;SUBTRACT BYTE n
                STA     (SENSPNT),Y     ;OVER WRITE VALUE n
                INY
  10            CPY     #63
                BMI     FRSTDI1         ;LOOP
                RTS

CALSTRT:  JSR     WHITES          ;FIND WHITE START POINT
                BCS     CALST1          ;ERROR EXIT
  15            STY     SENSTMP+2
                JSR     BLACKS
                BCS     CALST1
                JSR     BLACKE          ;FIND BLACK END POINT
                BCS     CALST1
  20            CLC
                TYA
                ADC     SENSTMP+2       ;GET MIDPOINT
                LSR     A
                SEC
  25            SBC     #19             ;OFFSET FRM CENTR OF CODE
                BCC     CALST1          ;ERROR EXIT
      CALST3:   STA     SENSTMP+4       ;FOUND STARTING POINT
                STA     TSKCONF+17      ;SAVE IN EAROM
                CLC
  30            RTS

CALST1:   EOR     #$FF
                CMP     #05
                BPL     CALST2          ;TOO FAR OFF CENTER ERROR
                LDA     #00
  35            BRA     CALST3

CALST2:   SEC
                RTS

SENSCON:  LDY     #01             ;START AT 1 + BEGINING
                JSR     BLACKS          ;FIND START OF BLACK
  40            BCS     SENSCOE         ;ERROR EXIT
                TYA
                LDY     SENSTMP+4
                LDX     #00             ;START AT BEGINING
                STA     SENSTMP+2       ;SAVE STRT OF BLK POS
  45            STA     SENBCDB+20
                CMP     SENSTMP+4       ;CHK AGAINST START POINT
                BMI     SENSCO1         ;START BLACK S,1,2,4,9,0
                SEC
                SBC     SENSTMP+4       ;WITHIN 4 CNTS OF STRT
```

VARAM-34559                    - 21 -

```
                CMP     #02
                BMI     SENSCO1         ;START BLACK S,1,2,4,9,0
                JSR     WHITES          ;FIND START OF WHITE
                BCS     SENSCOE         ;EXIT IF ERROR
 5              TYA
                INX
                STA     SENBCDB+20,X    ;SAVE IN BUFFER
                SEC
                SBC     SENSTMP+4       ;CHECK IF PAST END YET
10              CMP     #36
                BPL     SENSCO6
                JSR     BLACKS          ;CHECK IF ANOTHER BLACK
                BCS     SENSCO6         ;MUST NOT BE 7
                TYA
15              SEC
                SBC     SENSTMP+4       ;CHECK IF PAST END YET
                CMP     #40
                BPL     SENSCO6         ;MUST NOT BE 7
                LDY     #07
20              RTS

SENSCO6:    SEC
                LDA     SENBCDB+21
                SBC     SENSTMP+4       ;REMOVE OFFSET
                CMP     #30
25              BPL     SENSCO7         ;NOT 6 SKIP
                LDY     #06
                RTS

SENSCO7:    SEC
                LDA     SENBCDB+20
30              SBC     SENSTMP+4       ;REMOVE OFFSET
                CMP     #14
                BPL     SENSCO8         ;NOT 5 SKIP
                LDY     #05
                RTS

35  SENSCO8:    SEC
                LDA     SENBCDB+21
                SBC     SENBCDB+20      ;T2-T1
                LDY     #08
                BMI     SENSCO3         ;MUST BE 8
40              STA     SENBCDB+27      ;SAVE SIZE
                LDY     #03
                RTS

SENSCOE:    LDY     #$3F
                RTS

45  SENSCO1:    LDA     SENSTMP+2
                STA     SENBCDB+20      ;SAVE IN BUFFER
                JSR     WHITES          ;FIND START OF WHITE
                BCS     SENSCOE         ;EXIT IF ERROR
                TYA
50              INX
                STA     SENBCDB+20,X    ;SAVE IN BUFFER
```

VARAM-34559                        - 22 -

```
                JSR     BLACKS              ;FIND START OF BLACK
                BCS     SENSCO2             ;CHECK IF 0 OR 2
                TYA
                SEC
 5              SBC     SENSTMP+4           ;SUBTRACT OFFSET
                CMP     #36                 ;CHECK IF AT END
                BPL     SENSCO2             ;AT END CHECK IF 0 OR 2
                TYA
                INX
10              STA     SENBCDB+20,X        ;SAVE IN BUFFER
                JSR     WHITES
                BCS     SENSCOE             ;ERROR EXIT
                TYA
                INX
15              STA     SENBCDB+20,X        ;SAVE IN BUFFER
                SEC
                SBC     SENSTMP+4           ;CHCK POS OF LAST WHITE
                CMP     #33
                BPL     SENSCO4             ;SKIP NOT 1
20              LDY     #01
    SENSCO3:    RTS

SENSCO4:    BBS     SENKEEP,SENSFLG,SENSCO5    ;SKIP IF STARTD
                SEC
                LDA     SENBCDB+23
25              SBC     SENBCDB+22          ;WIDTH START CODE 2ND BAR
                STA     SENSTMP+2           ;SAVE (T4-T3)
                SEC
                LDA     SENBCDB+21
                SBC     SENBCDB+20
30              SEC
                SBC     SENSTMP+2           ;(T2-T1)-(T4-T3)
                BCS     SENSCO9             ;SKIP IF POSITIVE
                EOR     #$FF
                INC     A
35  SENSCO9:    CMP     #05                 ;CHK WITHIN 3 OF OTHR
                BPL     SENSCO5             ;TOO LARGE A DIFFERENCE
                JSR     CHKBEGN             ;MAKE SURE IT IS START
                BCS     SENSCOE             ;NOT START CODE
                LDY     #$0A
40              RTS

SENSCO5:    SEC
                LDA     SENBCDB+23          ;T4-T3
                SBC     SENBCDB+22
                PHA                         ;SAVE RESULT
45              SEC
                LDA     SENBCDB+21
                SBC     SENBCDB+20          ;T2-T1
                STA     SENSTMP+2           ;SAVE IN TEMP VARIABLE
                LDY     #09
50              SEC
                PLA
                SBC     SENSTMP+2
                BCC     SENSCOA             ;MIGHT BE 9
                CMP     #07
```

VARAM-34559                              - 23 -

```
                BMI     SENSCOE             ;T2-T1 TOO BIG
                LDY     #04                 ;MUST BE 4
                RTS

SENSCOA:   EOR     #$FF
 5              INC     A                   ;COMPLEMENT RESULT
                CMP     #7
                BMI     SENSCOJ             ;NOT 9
                RTS

SENSCO2:   LDY     #02
10              SEC
                LDA     SENBCDB+21
                SBC     SENBCDB+20          ;CHECK WIDTH OF BLACK
                CMP     #14
                BPL     SENSCO3             ;TO BROAD
15              LDY     #00
                RTS

SENSCOJ:   JMP     SENSCOE

BLACKS:    LDA     (SENSPNT),Y         ;CHECK IF LARGE NEGATIVE
                BPL     BLACKS1
20              SEC
                SBC     SENSTMP+1           ;CHECK IF > THRESHOLD
                BCS     BLACKS1             ;NOT BLACK ENOUGH SKIP
                RTS

BLACKS1:   INY
25              CPY     #63                 ;CHECK IF AT END POINT
                BMI     BLACKS              ;LOOP
                SEC
                RTS

BLACKE:    LDA     (SENSPNT),Y
30              BMI     BLACKE1             ;STILL BLACK SKIP
     BLACKE2:   CLC
                RTS

BLACKE1:   SEC
                SBC     SENSTMP+1           ;CHECK IF ENOUGH
35              BCS     BLACKE2             ;NO EXIT
                INY
                CPY     #63
                BMI     BLACKE
                SEC
40              RTS

WHITES:    LDA     (SENSPNT),Y         ;CHECK IF LARGE POSITIVE
                BMI     WHITES1
                CMP     SENSTMP             ;CHECK IF > THRESHOLD
                BMI     WHITES1             ;NOT WHITE ENOUGH SKIP
45              CLC
                RTS
```

VARAM-34559 — 24 —

```
    WHITES1:   INY
               CPY    #63
               BMI    WHITES
               SEC
 5             RTS

WHITEE:    LDA    (SENSPNT),Y
               BPL    WHITEE1          ;NOT BLACK CONTINUE
    WHITEE2:   CLC
               RTS

10  WHITEE1:   CMP    SENSTMP
               BMI    WHITEE2          ;BELOW THRESHOLD
               INY
               CPY    #63
               BMI    WHITEE           ;LOOP
15             SEC
               RTS

CALINTG:   LDA    #24              ;PNTS TO CENT OF WHT BAR
               CLC
               ADC    SENSTMP+4
20             ADC    #64              ;OFFST START OF STORE ARY
               TAY
               LDA    (SENSPNT),Y      ;GET VAL FRM STORE ARRAY
               CLC
               ADC    #08
25             SEC
               SBC    TSKCONF+19       ;CENTER+4 > SATURATION ?
               BCC    CALINT1          ;SKIP IF <
               LDA    TSKCONF+18       ;GET INTEGRATION TIME
               AND    #$FE             ;MASK OFF LSB
30             SEC
               SBC    #$1C
               BCC    CALINT2          ;TOO SMALL ALREADY EXIT
               LDA    TSKCONF+18
               AND    #$FE
35             SEC
               SBC    #$04
               STA    TSKCONF+18       ;INT=INT-4
               STA    PRE3             ;UPDATE INTEGRATION TIME
               RTS

40  CALINT1:   LDA    TSKCONF+18
               BMI    CALINT2          ;ALREADY TOO LONG EXIT
               AND    #$FE
               CLC
               ADC    #$04
45             STA    TSKCONF+18
               STA    PRE3
    CALINT2:   RTS

MAXMIN:    LDM    #$00,SENSTMP     ;SAVE SMALL VALUE IN MAX
               LDM    #$FF,SENSTMP+1   ;SAVE LARGE VALUE IN MIN
50  MAXMIN1:   LDA    (SENSPNT),Y      ;GET POINT
```

VARAM-34559                                                  - 25 -

```
                BMI     MAXMIN2              ;IF NEGATIVE SKIP
                CMP     SENSTMP
                BMI     MAXMIN3              ;NOT LARGER OR EQUAL LOOP
                LDA     (SENSPNT),Y
5               STA     SENSTMP              ;UPDATE MAX VALUE
                BRA     MAXMIN3              ;LOOP

MAXMIN2:   SEC
                SBC     SENSTMP+1            ;VALUE-MIN
                BCS     MAXMIN3              ;NOT SMALLER SKIP
10              LDA     (SENSPNT),Y
                STA     SENSTMP+1
     MAXMIN3:   INY
                DEX
                BNE     MAXMIN1              ;LOOP X NUMBER OF TIMES
15              LDA     SENSTMP
                STA     $F003
                LDA     SENSTMP+1            ;GET BLACK MAX
                STA     $F003
                EOR     #$FF                 ;TAKE TWOS COMPLEMENT
20              INC     A
                CMP     SENSTMP              ;COMPARE WITH MAX WHITE
                BPL     MAXMIN5              ;IF BLCK LESS ADJST WHITE
                STA     SENSTMP              ;REDUCE WHITE
     MAXMIN5:   LDA     SENSTMP
25              CMP     SENCONS              ;CHECK IF BIG ENOUGH
                BMI     MAXMIN4              ;NOT LARGE ENOUGH EXIT
                LSR     A                    ;DIVIDE BY TWO
                STA     SENSTMP
                STA     $F003
30              EOR     #$FF                 ;TAKE TWOS COMPLEMENT
                INC     A
                STA     SENSTMP+1
                CLC
                RTS

35   MAXMIN4:   SEC
                RTS

CHKBEGN:   LDA     SENSTMP+2
                LSR     A
                CLC
40              ADC     SENBCDB+22           ;GET MIDPNT OF SECOND BAR
                ADC     #64                  ;ADD OFFST TO VAL BUFFER
                TAY                          ;MAKE IT THE INDEX
                LDA     (SENSPNT),Y          ;GET VALUE
                LSR     A                    ;DIVIDE IT BY 2
45              STA     SENSTMP+2            ;SAVE IT
                SEC
                LDA     SENBCDB+21
                SBC     SENBCDB+20
                LSR     A
50              CLC
                ADC     SENBCDB+20           ;GET MIDPNT OF FIRST BAR
                ADC     #64                  ;ADD OFFST TO VAL BUFFER
                TAY                          ;MAKE IT THE INDEX
```

VARAM-34559                                  - 26 -

```
                    LDA     (SENSPNT),Y         ;GET VALUE
                    LSR     A                   ;DIVIDE IT BY 2
                    CLC
                    ADC     SENSTMP+2           ;ADD IT TO MAX OF 2ND BAR
5                   ADC     #$20                ;WHT MUST > BLK BY $30
                    BCS     CHKBEG1             ;BLK TO WHT EXT NOT START
                    STA     SENSTMP+2           ;SAVE IT
                    SEC
                    LDA     SENBCDB+22
10                  SBC     SENBCDB+21
                    LSR     A
                    CLC
                    ADC     SENBCDB+21          ;GET MIDPNT OF WHITE BAR
                    ADC     #64                 ;ADD OFFSET TO VAL BUFFER
15                  TAY                         ;MAKE IT THE INDEX
                    SEC
                    LDA     SENSTMP+2           ;GET THRESHOLD FOR WHITE
                    SBC     (SENSPNT),Y         ;CHECK IF WHITE LARGER
        CHKBEG1:    RTS                         ;EXIT CARY CLR MEANS STRT

20      SENSSTR:    BBC     SENSAVE,SENSFLG,SENSSTC    ;FIX AFTER TEST
                    BBS     SENKEEP,SENSFLG,SENSST2    ;MUST GOOD READ
                    CPY     #$0A
                    BNE     SENSSTD             ;NO START AGAIN SKIP
                    SEB     SENKEEP,SENSFLG     ;MARK TO START
25      SENSSTE:    JMP     SENSST1             ;DO 1 LINE FEED

SENSSTD:    SEB     SENKEEP,SENSFLG     ;MARK SECOND LF
                    BMI     SENSST2             ;GOOD READ KEEP IT
                    BPL     SENSSTE             ;DO 1 LINEFEED
        SENSSTC:    BBS     SENSAGN,SENSFLG,SENSST2    ;CHK NUM AGAIN
30                  CPY     #$0A
                    BNE     SENSSTE             ;ERROR EXIT
        SENSSTZ:    SEB     SENSAVE,SENSFLG     ;SET STARTED FLAG
                    SEB     SENLOAD,SENSFLG     ;SET LOADING FLAG
                    LDM     #$00,SENBYTB        ;START AT 0
35                  LDM     #$00,QCNT           ;CLEAR ? COUNTER
                    JSR     PRCSET
                    BRA     SENSSTE

SENSST2:    TYA
        SENSST4:    LDX     SENBYTB             ;GET POINTER TO BUFFER
40                  BBC     SENSAGN,SENSFLG,SENSSTK    ;SKIP NOT AGAIN
                    CLB     SENSAGN,SENSFLG     ;CLEAR FLAG
                    CMP     SENBCDB,X           ;CHECK IF MATCH
                    SEC
                    BNE     SENSSTL             ;CORRECT REENTER LOOP
45                  CPX     #00                 ;CHECK IF POR CHECK
                    BNE     SENSSTM             ;NO SKIP
                    CLC                         ;MARK TO SET PARK
                    BRA     SENSSTL             ;REENTER LOOP

SENSSTM:    JSR     CMPUTO              ; STORE IN MEMORY
50                  BRA     SENSSTL             ;ERROR REENTER LOOP
```

VARAM-34559                           - 27 -

```
         SENSSTK:  STA   SENBCDB,X             ;PLACE IN BUFFER
                   CMP   #$3F                  ;CHECK IF ?
                   BNE   SENSSTQ               ;SKIP IF NOT
                   INC   QCNT                  ;BUMP Q CNT
5        SENSSTQ:  INC   SENBYTB               ;BUMP POINTER
                   LDA   SENBYTB
                   CMP   #06                   ;CHECK AFTER SIX READS
                   BNE   SENSSTP               ;SKIP IF NOT SIX
                   LDA   QCNT                  ;CHECK HOW MANY ? SO FAR
10                 CMP   #04                   ;IF 4 OR MORE RESTART
                   BMI   SENSSTP               ;IF LESS CONTINUE
                   CLB   SENSAVE,SENSFLG
                   CLB   SENKEEP,SENSFLG       ;CLR FLAGS TRY TO RE SYNC
         SENSSTP:  LDA   SENBYTB
15                 CMP   #19
         SENSSTG:  BNE   SENSST1               ;CONTINUE
                   JSR   CMPUTE                ;CHK NUMBER AGAINST KNOWN
                   BBS   SENSAGN,SENSFLG,SENSST1    ;DO ONE MORE
         SENSSTL:  BCC   SENSSTA
20                 CLB   SENSAVE,SENSFLG       ;SET TO TRY AT STRT AGAIN

CLB   SENPARK,SENSFLG       ;CLEAR PARK
                   CLB   SENKEEP,SENSFLG       ;CLEAR KEEP FLAG
                   LDA   SENBYTB
25                 BEQ   SENSSTO               ;AT POR OR LSTDIDGT EXT
                   LDM   #$00,SENBYTB          ;CLEAR BYTE COUNTER
                   BRA   SENSSTN               ;TRY ANOTHER LINE & EXIT

SENSSTA:  JSR   SENSOFF
                   SEB   SENPARK,SENSFLG       ;MARK AM NOW PARKED
30                 LDM   #$00,SERCNT           ;CLEAR ERROR COUNTER

LDA   CLINPPG
                   CMP   #02
                   BMI   SENSSTO               ;SKIP IF 0 OR 1
35                 LDM   #$00,CLINPPG          ;ALIGN TOF WITH THIS PNT
         SENSSTO:  CLC                         ;NO ERROR
                   RTS

SENSST1:  JSR   BUMPCLP               ;UPDATE LINES THIS PAGE
40                 BBC   2,SENERBF,SENSSTN     ;SKP NOT PAST EOF
                   LDA   CLINPPG               ;CHECK IF 1
                   BEQ   SENSSTN               ;NOT 0 CONTINUE
                   LDA   SENBYTB               ;CHECK IF AT LAST SYMBOL
                   CMP   #18
45                 BPL   SENSSTN               ;TRY JUST ONE MORE
                   CLB   SENLOAD,SENSFLG       ;CLEAR LOADING FLAG
                   JSR   SENSOFF
                   BBS   1,SENERBF,SENSSTS     ;SKP NOT CONSECUTIVE
                   INC   SERCNT                ;BUMP ERROR COUNTER
50                 LDA   TSKCONF+20            ;TOTAL NUM ERRORS OK
                   LSR   A                     ;JUSTIFY
                   CMP   SERCNT
                   BEQ   SENSSTT               ;SKIP IF NOT CONSECUTIVE
                   JSR   NXTSNUM               ;SETUP NEXT SERIAL NUMBER
```

VARAM-34559 - 28 -

```
                LDX     #00
                LDY     #00                     ;PREP UPDATE SERIAL NUM
                JSR     CMPUT3A                 ;UPDATE SERIAL NUMBER
                CLB     SUMEMBT,SUPRFLG         ;DO NOT WRITE TO EAROM
  5             DEC     CLINPPG
                CLC
                RTS

SENSSTT:   LDA     #$DD                    ;ERASE THE NUM IN MEMORY
                STA     TSKCONF+7
 10             STA     TSKCONF+9
                STA     TSKCONF+11
                STA     TSKCONF+13
                STA     TSKCONF+15
     SENSSTS:   DEC     CLINPPG                 ;CLR NOT DOING ANTHR LNE
 15             SEB     1,SENERBF               ;SET NOT CONSECUTIVE
                LDM     #$00,SERCNT             ;CLEAR COUNTER
                CLC
                RTS

SENSSTN:   JSR     ONELINE
 20             CLC
                RTS

BUMPCLP:   INC     CLINPPG                 ;BUMP CURNT LINE OF PAGE
                LDA     CLINPPG
                CMP     LINPPG                  ;CHECK IF AT END OF FORM
 25             BNE     BUMPCL1                 ;NOT TOO MANY SKIP
                LDA     #00
                STA     CLINPPG                 ;CLEAR LINES OF PAGE
                SEB     2,SENERBF               ;SET AT END OF FORM BIT
     BUMPCL1:   RTS

30  SENSOFF:   LDA     #00
                STA     SENBYTB
                CLB     SENSAVE,SENSFLG
                CLB     SENKEEP,SENSFLG
                CLB     2,SENERBF               ;CLEAR AT END OF FORM BIT
 35             SEB     BLFBT,SSWTFLG           ;CLEAR LF PUSHED FLAG
                CLB     2,STATFLG
                CLB     6,STATFLG               ;CLEAR LF MOTOR FLAG
                SEB     LFSOLBT,P3              ;MAKE SURE LF IS OFF
                SEB     6,SSWTFLG               ;DISABLE LF TILL RELEASED
 40             CLB     SENLOAD,SENSFLG         ;CLEAR LOADING FLAG
                JSR     PRCCLR
                RTS

CHKBCD:    LDA     #00                     ;CHECK MODULO 9
                STA     SENSTMP+1
 45             CLC
     CHKBCD1:   PHA
                LDA     SENBCDB,X
```

VARAM-34559                                  - 29 -

```
                    CMP     #$3F                ;CHECK IF ?
                    BNE     CHKBCD5             ;ERROR EXIT
                    INC     SENSTMP+1
         CHKBCD5:   PLA
 5                  CLC
                    ADC     SENBCDB,X
                    INX
                    INX
                    CPX     #18                 ;DO ALL BUT LAST ONE
10                  BMI     CHKBCD1
                    PHA
                    LDA     TSKCONF+6           ;FIND OUT WHCH CHKSUM MDE
                    BBC     1,A,CHKBCD6         ;IF CLEAR BRANCH
                    PLA
15       CHKBCD3:   CMP     #9
                    BPL     CHKBCD2             ;CHECK REMAINDER
                    CMP     SENBCDB,X           ;CHECK REMAINDER MATCHES
                    BNE     CHKBCD4
                    LDX     SENSTMP+1
20                  BNE     CHKBCD4             ;ERRORS FOUND EXIT
                    SEC
                    RTS

CHKBCD2:   SEC
                    SBC     #$09                ;SUBTRACT 9
25                  BRA     CHKBCD3

CHKBCD4:   CLC
                    RTS

CHKBCD6:   PLA
                    CPX     #19                 ;CHECK IF ODD SEQUENCE
30                  BEQ     CHKBCD8
                    CLC
                    ADC     SENBCDB,X           ;MUST BE 18 ADD IT
         CHKBCD8:   CMP     #09
                    BMI     CHKBCD4             ;ERROR REMAINDER
35                  BNE     CHKBCD9             ;SUBTRACT 9
                    CPX     #19                 ;CHECK IF ODD SEQENCE
                    BEQ     CHKBCD4             ;SKIP IF ODD SEQENCE
                    LDX     SENSTMP+1
                    BNE     CHKBCD4             ;ERROR EXIT ERRORS FOUND
40                  SEC
                    RTS

CHKBCD9:   SEC
                    SBC     #09
                    BRA     CHKBCD8             ;LOOP

45       CALCSM:    LDA     TSKCONF+6
                    BBC     1,A,CALCSM4         ;BRANCH IF BIT CLEAR
                    LDA     TSKCONF+15
                    AND     #$0F
                    INC     A
```

VARAM-34559                                    - 30 -

```
                  CMP      #09
                  BMI      CALCSM1            ;NO CARRY
                  LDA      #00
                  BRA      CALCSM1            ;REENTER LOOP

5    CALCSM4:    BBC      2,A,CALCSM5        ;SKIP IF 9 IS VALID
                  LDA      TSKCONF+15
                  AND      #$0F
                  DEC      A
                  BNE      CALCSM1            ;REENTER IF NOT 0
10                LDA      #$09               ;SEED WITH NINE
                  BRA      CALCSM1            ;REENTER

CALCSM5:    LDA      TSKCONF+15
                  AND      #$0F
                  DEC      A
15                BPL      CALCSM1
                  LDA      #08
      CALCSM1:    RTS

SETEREV:    LDX      #00                ;STRT BEGIN OF SERIAL NUM
                  LDY      #1                 ;START BEGINING OF BUFFER
20    SETERE1:    LDA      SENBCDB,X          ;GET SERIAL NUM EVN SET
                  STA      SENERBF,Y          ;SAVE IN ERROR BUFFER
                  INX                         ;SERIAL NUM INDEX + 2
                  INX
                  INY                         ;ERROR BUFFER INDEX + 1
25                CPX      #20                ;DO 10 TIMES
                  BNE      SETERE1
                  SEB      0,SENERBF          ;FLAG TO COMP ERROR BUF
                  RTS

SETEROD:    LDX      #00                ;STRT BEGIN OF SERIAL NUM
30                LDY      #1                 ;START BEGINING OF BUFFER
      SETERO1:    LDA      SENBCDB+1,X        ;SERIAL NUMBER OF ODD SET
                  STA      SENERBF,Y          ;SAVE IN ERROR BUFFER
                  INX                         ;SERIAL NUMBER INDEX + 2
                  INX
35                INY                         ;ERROR BUFFER INDEX + 1
                  CPX      #20                ;DO 10 TIMES
                  BNE      SETERO1
                  SEB      0,SENERBF          ;FLAG TO COMP ERROR BUF
                  RTS

40    CALCC:      CLC
                  BRA      CALCNX2

CALCNXT:    JSR      CALCSM             ;CALCULATE CHECKSUM
                  STA      SENSTMP+2          ;CHKSUM NUMBER
                  LDA      TSKCONF+15
45                LSR      A
                  LSR      A
                  LSR      A
                  LSR      A
                  INC      A
```

VARAM-34559                    - 31 -

```
                CMP        #10
                BNE        CALCC                ;CLEAR CARRY
                LDA        #00
                SEC
 5  CALCNX2:    STA        SENSTMP+1            ;LSB NUMBER
                LDA        TSKCONF+13
                AND        #$0F
                ADC        #00                  ;ADD CARRY
                STA        SENSTMP
10              CMP        #10
                BNE        CALCNX3              ;SKIP IF NO CARRY
                LDA        #00
    CALCNX3:    STA        SENSTMP              ;10S DIDGIT
                RTS

15  NXTSNUM:    SEI
                SED
                LDX        #16
                LDY        #15
                LDA        TSKCONF,Y
20              ADC        #$10
                PHP
                LSR        A
                LSR        A
                LSR        A
25              LSR        A
                STA        SENBCDB+1,X
                STA        SENBCDB,X
    NXTSN1:     PLP
                NOP
30              DEY
                DEY
                LDA        TSKCONF,Y
                ADC        #00
                PHA
35              AND        #$0F
                DEX
                DEX
                STA        SENBCDB+1,X
                STA        SENBCDB,X
40              DEX
                DEX
                PLA
                PHP
                LSR        A
45              LSR        A
                LSR        A
                LSR        A
                STA        SENBCDB+1,X
                STA        SENBCDB,X
50              CLD
                CLI                             ;ENABLE INTERRUPTS
                NOP
                SEI
                SED
55              CPX        #00
                BNE        NXTSN1
```

VARAM-34559  - 32 -

```
                    PLP
                    NOP
                    CLD
                    CLI
5                   JSR     CALCSM              ;CALCULATE CHECKSUM VALUE
                    STA     SENBCDB+18
                    STA     SENBCDB+19
                    RTS

CMPUT1:     LDA     TSKCONF+7
10                  CMP     #$DD                ;IF ERASED WILL BE DD
                    BNE     CMPUT1K             ;CONTINUE IF NOT ERASED
                    JMP     CMPUT1I             ;NOTHING 2 COMPARE TO EXT

CMPUT1K:    JSR     CALCNXT             ;COMPUTE NEXT NUMBER
                    LDM     #00,SENSTMP+9       ;CLEAR NUMBER OF MATCHES
15                  LDA     SENSTMP
                    STA     SENERBF+8           ;WRT CORECT VAL N ERR BUF
                    CMP     SENBCDB+14
                    BEQ     CMPUT1A             ;MATCH TRY NEXT
                    CMP     SENBCDB+15
20                  BEQ     CMPUT1A             ;MATCH TRY NEXT
                    INC     SENSTMP+9           ;ADD MISMATCH
                    LDM     #$0F,SENERBF+8      ;SET ? IN SERIAL NUMBER
        CMPUT1A:    LDA     SENSTMP+1
                    STA     SENERBF+9
25                  CMP     SENBCDB+16
                    BEQ     CMPUT1B             ;MATCH TRY NEXT
                    CMP     SENBCDB+17
                    BEQ     CMPUT1B             ;MATCH TRY NEXT
                    LDM     #$0F,SENERBF+9
30                  INC     SENSTMP+9           ;ADD MISMATCH
        CMPUT1B:    LDA     SENSTMP+2
                    STA     SENERBF+10
                    CMP     SENBCDB+18
                    BEQ     CMPUT1C
35                  LDM     #$0F,SENERBF+10
                    LDA     SENSTMP+9
                    BEQ     CMPUT1C             ;GOOD ENOUGH
                    CMP     #02
                    BEQ     CMPUT1I             ;NO GOOD EXIT
40                  BRA     CMPUT1H             ;CHECK FOR LAST BYTE

CMPUT1H:    SEB     SENSAGN,SENSFLG     ;CHECK NXT
                    LDA     SENSTMP+2
                    STA     SENBCDB+19
                    JSR     NXTSNUM
45                  RTS

CMPUT1I:    SEC
                    RTS

CMPUT1C:    LDA     SENSTMP+9
                    CMP     #02
50                  BEQ     CMPUT1I             ;NO GOOD EXIT
```

```
                JSR     NXTSNUM
                JMP     CMPUT3              ;WRITE TO EAROM

CMPUT3J:  LDA     SENBCDB+18          ;GET CHECK-SUM BYTE
                CMP     #03                 ;CHECK IF IT IS 3
  5             BNE     CMPUT3K             ;SKIP IF NOT 3
                LDA     SENBCDB+27
                LSR     A
                LSR     A
                STA     SENBCDB+21
 10             SEC
                LDA     SENBCDB+27
                SBC     SENBCDB+21
                STA     TSKCONF+16          ;UPDATE CORRECT 3 SIZE
      CMPUT3K:  CMP     #07
 15             BNE     CMPUT3L
      CMPUT3L:  JMP     CMPUT3

CMPUTE:   CLB     0,SENERBF           ;CLEAR ERROR FLAG
                LDX     #00
                JSR     CHKBCD              ;CHECK CHECKSUM
 20             BCS     CMPUT3J             ;CORRECT CHECKSUM BRANCH
                LDA     SENSTMP+1
                STA     SENSTMP+2           ;SAVE NUMBER OF BAD BYTES
                LDX     #01
                LDA     #$0A
 25             STA     SENBCDB+19          ;FORCE LAST BYTE ERROR
                JSR     CHKBCD              ;CHECK ODD SET
                LDX     SENSTMP+1
                BEQ     CMPUT7J             ;POSSIBLY CORRECT READ
                CPX     SENSTMP+2
 30             BMI     CMPUT5              ;USE ODD
                LDA     SENSTMP+2
                LDX     #00
      CMPUT6B:  LDA     SENBCDB,X
                CMP     #$3F
 35             BEQ     CMPUT6A             ;TRY TO MATCH IT
      CMPUT6D:  INX
                INX
                CPX     #20
                BNE     CMPUT6B             ;LOOP TO 20
 40             LDX     #00
                JSR     CHKBCD              ;CHECK IT NOW
                BCS     CMPUT3              ;GOT IT RIGHT
                JSR     SETEREV             ;COPY EVN SET TO ERR BUF
                JMP     CMPUT1              ;I GIVE UP
 45   CMPUT6A:  LDA     SENBCDB+1,X
                CMP     #$3F
                BEQ     CMPUT6C             ;CANNOT HELP
                STA     SENBCDB,X           ;CHANGE NUMBER
                BRA     CMPUT6D             ;GO BACK TO LOOP
 50   CMPUT6C:  CPX     #00
                BEQ     CMPUT6D             ;CANNOT HELP RETURN
```

VARAM-34559                                      - 34 -

```
                LDA     SENBCDB-1,X
                STA     SENBCDB,X
                BRA     CMPUT6D             ;RETURN

CMPUT7J:  LDX     SENSTMP+2           ;NO ERRORS GO TO CMPUT2
  5             BEQ     CMPUT2A
                JMP     CMPUT7

CMPUT5:   LDX     #01
      CMPUT5B:  LDA     SENBCDB,X
                CMP     #$3F
 10             BEQ     CMPUT5A             ;TRY TO MATCH IT
      CMPUT5D:  INX
                INX
                CPX     #18
                BMI     CMPUT5B             ;LOOP TO 20
 15             LDX     #01
                JSR     CHKBCD              ;CHECK IT NOW
                LDA     SENSTMP+1           ;CHECK IF ANY ERRORS
                BNE     CMPUT2C             ;SKIP FOUND ERROR
                CLC
 20             ADC     SENBCDB+18          ;GUESS ODD CHKSUM CORRECT
                BEQ     CMPUT5E
                CMP     #09
                BEQ     CMPUT5E
                BRA     CMPUT2C             ;I GIVE UP

25   CMPUT5A:  LDA     SENBCDB-1,X
                CMP     #$3F
                BEQ     CMPUT5C             ;CANNOT HELP
                STA     SENBCDB,X           ;CHANGE NUMBER
                BRA     CMPUT5D             ;GO BACK TO LOOP

30   CMPUT5C:  CPX     #19
                BEQ     CMPUT5D
                LDA     SENBCDB+1,X
                STA     SENBCDB,X
                BRA     CMPUT5D             ;RETURN

35   ;CMPUT2:  JMP     CMPUT1              ;TRY COMP WITH NEXT NUMB

CMPUT2C:  JSR     SETEROD             ;SET ODD SEQ TO ERR BUF
                JMP     CMPUT1              ;TRY COMP WITH NEXT NUMB

CMPUT2A:  STA     SENBCDB+19          ;THIS IS REMAINDER
                LDA     #09
 40             SEC
                SBC     SENBCDB+19          ;THIS IS CHECKSUM
                CMP     SENBCDB+18          ;CHK EVEN MATCHES CHKSM
                BNE     CMPUT2C             ;YES GOOD

CMPUT2B:  STA     SENBCDB+19
 45   CMPUT5E:  LDX     #00
      CMPUT5F:  LDA     SENBCDB+1,X
                STA     SENBCDB,X
                INX
                INX
```

VARAM-34559                                - 35 -

```
                    CPX         #20
                    BNE         CMPUT5F           ;MOVE ODD INTO EVEN FOR
            WRITE
            CMPUT3: JSR         SETERBF           ;SETUP ERROR BUFFER
 5                  BCS         CMPUT3C           ;ERR IN CONSEC NUM CHCK
                    LDX         #00
                    LDY         #00
            CMPUT3A:LDA         SENBCDB,X         ;GET MSB
                    ASL         A
10                  ASL         A
                    ASL         A
                    ASL         A
                    STA         SENBCDB,X
                    LDA         TSKCONF+7,Y
15                  AND         #$0F
                    ORA         SENBCDB,X
                    STA         TSKCONF+7,Y
                    INX
                    INX
20                  LDA         TSKCONF+7,Y
                    AND         #$F0
                    ORA         SENBCDB,X
                    STA         TSKCONF+7,Y
                    INX
25                  INX
                    INY
                    INY
                    CPX         #20
                    BMI         CMPUT3A
30                  SEB         SUMEMBT,SUPRFLG   ;SET TO WRITE EAROM
                    CLB         1,SENERBF         ;CLR POR/PAPER EMPTY FLAG
                    CLC
                    RTS

CMPUT3C:SEC
35                  RTS

CMPUT0: STA         SENERBF+10        ;WRITE CHECKSUM
                    JSR         SETERBF
                    BCS         CMPUT3C           ;CARY SET MUST ERROR EXIT
                    LDX         #01
40                  LDY         #00
                    BRA         CMPUT3A

CMPUT7: STA         SENBCDB+19        ;SAVE REMAINDER
                    LDA         TSKCONF+6
                    BBC         2,A,CMPUT7C       ;SKIP IF CHKSUM 0 / 9
45                  LDA         SENBCDB+19
                    CMP         #09
                    BEQ         CMPUT7D
            CMPUT7C:SEC
                    LDA         #09
50                  SBC         SENBCDB+19        ;GET REMAIN FOR GOOD SUM
            CMPUT7D:STA         SENBCDB+19
                    LDX         #00
            CMPUT7A:LDA         SENBCDB+1,X
```

VARAM-34559                           - 36 -

```
                STA     SENBCDB,X
                INX
                INX
                CPX     #14
 5              BNE     CMPUT7A             ;SKIP LAST THREE DIDGITS
                LDX     #00                 ;MOVE ODD TO EVEN FOR WRT
                JSR     CHKBCD              ;CHECK CHECKSUM
                BCS     CMPUT3              ;CORRECT CHECKSUM BRANCH
                JSR     SETEREV
10              JMP     CMPUT1              ;CHECK LAST THREE DIGITS

EARNUM:     LDX     #00
    EARNUM2:    LDA     TSKCONF+7,X         ;CHCK IF WE HAVE A NUMBER
                CMP     #$DD                ;IF NO NUMBER IS ALL DD
                BNE     EARNUM1             ;WE HAVE A NUMBER
15              INX
                INX
                CPX     #10
                BNE     EARNUM2             ;DO 5 TIMES
                CLC
20              RTS

EARNUM1:    SEC
                RTS

SETERBF:
                LDX     #00                 ;STRT BEGIN OF SERIAL NUM
25              LDY     #01                 ;START BEGIN OF ERR BUF
    SETERB1:    LDA     SENBCDB,X           ;GET SERIAL NUM FRM BUF
                BBS     0,SENERBF,SETERB2   ;SKIP IF ERROR FOUND
                STA     SENERBF,Y           ;SVE SRIAL NUM IN ERR BUF
    SETERB3:    INX
30              INX
                INY
                CPX     #20                 ;DO 10 TIMES
                BNE     SETERB1
                JSR     CONSEC              ;CHECK IF CONSECUTIVE
35              RTS

SETERB2:    CMP     SENERBF,Y           ;COMP RESULT WITH ERR BUF
                BEQ     SETERB3             ;SKIP IF THE SAME
                LDA     #$3F                ;GET ?
                STA     SENERBF,Y           ;UPDATE ERROR BUF WITH ?
40              BRA     SETERB3             ;LOOP

TSKERBF:    LDX     #07                 ;FIRST BYTE OF SERIAL
    NUMBER BYTE
                LDY     #01                 ;FIRST BYTE OF ERR BUFFER
    TSKERB1:    LDA     TSKCONF,X           ;GET SERIAL NUMBER
45              LSR     A
                LSR     A
                LSR     A
                LSR     A
                STA     SENERBF,Y           ;SAVE IN ERROR BUFFER
50              INY
                LDA     TSKCONF,X
```

VARAM-34559                     - 37 -

```
                AND     #$0F
                STA     SENERBF,Y       ;SAVE IN ERROR BUFFER
                INY
                INX
 5              INX
                CPX     #17
                BNE     TSKERB1         ;LOOP 5 TIMES
                RTS

CONSEC6: CLC
10              RTS

CONSEC:  BBS     1,SENERBF,CONSEC6  ;SKIP NOT CONSEC
                SEI
                SED
                LDY     #10
15              CLC
                LDA     TSKCONF+5,Y     ;GET BCD VALUE
                ADC     #$10            ;ADD 1 TO MSB
                PHA                     ;SAVE RESULT ON STACK
                PHP                     ;SAVE CARRY ON STACK
20              DEY                     ;SUBTRCT 2 FROM INDEX REG
                DEY
       CONSEC1: PLP                     ;RESTORE CARRY
                NOP
                LDA     #00             ;ADD 0 TO THE REST
25              ADC     TSKCONF+5,Y     ;ADD TO BCD VALUE
                PHA                     ;SAVE RESULT ON STACK
                PHP                     ;SAVE CARRY ON STACK
                DEY                     ;SUBTRCT 2 FROM INDEX REG
                DEY
30              BNE     CONSEC1         ;DO 10 TIMES
                PLP                     ;RESTORE STACK
                NOP
                CLD                     ;CLEAR DECIMAL MODE
                CLI                     ;ENABLE INTERRUPT
35              LDY     #$FE
                LDX     #00
       CONSEC4: INY
                INY
                PLA
40              PHA                     ;GET TOP OF STACK
                LSR     A
                LSR     A
                LSR     A
                LSR     A
45              CMP     SENBCDB,Y       ;CHECK IF THE SAME
                BEQ     CONSEC2         ;SKIP IF MATCH
                LDX     #$FF            ;SET ERROR FLAG
       CONSEC2: INY
                INY
50              CPY     #18             ;CHECK IF DONE
                BEQ     CONSEC3         ;YES SKIP OUT
                PLA                     ;GET RESULT AGAIN
                AND     #$0F            ;GET JUST LSB OF RESULT
                CMP     SENBCDB,Y       ;CHECK LSB
55              BEQ     CONSEC4         ;LOOP
```

VARAM-34559                         - 38 -

```
                LDX     #$FF            ;SET ERROR FLAG
                BRA     CONSEC4

CONSEC3:  PLA                     ;RESTORE STACK
                CPX     #00
                BNE     CONSEC5         ;ERRORS EXIT
                CLC
                RTS
```

VARAM-34559                    - 39 -

```
CONSEC5:   SEC
           RTS

END
```

;################# End of V28SENSE.ASM #################

What is claimed is:

1. A method for identifying a negotiable instrument that is to be issued by receiving variable printed information thereon, said method utilizing a radiation source and an array sensitive to radiation, a radiation path defined therebetween, and also a printer, comprising:

marking the negotiable instrument with an identification symbol, portions of said symbol being more opaque than the surrounding negotiable instrument;

advancing the negotiable instrument along the radiation path;

shining radiation through the negotiable instrument at the location of the symbol and adjacent said symbol to create a radiation transmission image;

sensing said radiation transmission image;

generating a signal in response to the transmission image;

processing said signal to determine the identification information coded by said identification symbol printed on the negotiable instrument;

printing variable information upon the negotiable instrument to thereby issue it; and associating the identification information with the variable information that is printed on the negotiable instrument and storing the identification information for later retrieval.

2. A method as in claim 1 further comprising:

determining an expected identification value of said negotiable instrument;

comparing the identification information carried by said identification symbol with the expected identification value; and generating a signal if said identification information is different than the expected identification value.

3. A method as in claim 1 wherein said identification symbol comprises a pattern of parallel stripes of pigmented bars and unpigmented spaces.

4. A method as in claim 1 wherein said symbol comprises a plurality of patterns, each said pattern representing a digit, and said plurality of patterns are combined in abutting vertical juxtaposition to form an identification symbol which represents a multi-digit number.

5. A method as in claim 4 wherein said symbol is moved between said radiation source and said radiation sensor, said signal sampled during said movement to determine a digit signal, each such digit signal combined with each subsequent digit signal to determine the multi-digit identification number encoded by said identification symbol.

6. A method as in claim 5, comprising the additional steps of:

including a check sum pattern in the symbol;

combining the value determined for all the patterns other than the check sum to obtain a combined value;

using the value of the check sum pattern to verify the combined value.

7. A method as in claim 6 wherein:

including the checksum pattern includes using as the checksum pattern a pattern that represents at least one digit; and using the value includes determining whether the sum of the digit represented by the checksum pattern and the combined value is evenly divisible by a predetermined number.

8. A method as in claim 4 further comprising:

sampling a plurality of signals representing each said pattern;

processing each said signal to obtain alternative values for each said pattern;

determining the relative reliability of the alternative value;

combining only the most reliable value for each pattern with the most reliable value of each other pattern in said symbol to determine a value for said symbol.

9. A method as in claim 4 further comprising:

stepwise moving the negotiable instrument along an advancement path, past a predetermined area where said radiation is shined through the negotiable instrument;

wherein the advancement path extends parallel to the vertical juxtaposition of said plurality of patterns; and wherein stepwise moving said negotiable instrument includes moving it in a distance for each stepwise movement less than a vertical distance spanned by each pattern.

10. A method as in claim 1 further comprising printing as the variable printed information each of negotiable instrument amount, a date that the negotiable instrument is printed and a negotiable instrument payee upon said negotiable instrument.

11. A device for issuing a negotiable instrument by automatically identifying a serial number marked on the negotiable instrument and associating the serial number with transaction information relating to the issuance of the negotiable instrument, said device comprising:

a printer that prints transaction information on the negotiable instrument, to thereby issue the negotiable instrument;

a feed mechanism that advances the negotiable instrument along a path of advancement, the path defining a direction of advancement;

a plurality of preprinted patterns on the negotiable instrument, each one located at a different position upon the negotiable instrument relative to the direction of advancement;

a radiation source positioned to shine radiation upon the plurality of patterns;

a radiation detector positioned to sequentially detect each one of the plurality of preprinted patterns, the radiation detector producing an electronic signal representing each pattern as the negotiable instrument is moved along the path of advancement;

a digital processor coupled to the radiation detector to receive the electronic signal, and also to the printer to control the issuance of the negotiable instrument, the digital processor detecting the serial number from the electronic signal and associating the transaction information with the serial number.

12. A device as in claim 11 wherein:

said feed mechanism is a stepwise advance mechanism that periodically advances the negotiable instrument in a discrete amount chosen to be less than the height of any one of the plurality of patterns along the direction of advancement;

the radiation detector and the radiation source together form a line-scan device, one of the plurality of patterns being line-scanned following each stepwise advance;

each one of the plurality of patterns is line-scanned by the radiation detector at least once; and said digital processor includes means for deciding between multiple line-scans for at least one of the plurality of patterns, to thereby identify the serial number despite ambiguous pattern interpretations produced by non-alignment between the line scans and the patterns.

13. A device as in claim 12 wherein:

the plurality of patterns includes a checksum; and said digital processor includes means for using the checksum to chose between alternative line-scans for at least one of the plurality of patterns.

14. A device as in claim 12 wherein:

the feed mechanism stepwise advances the negotiable instrument by a discrete amount chosen such that each one of the plurality of patterns is line-scanned at least once, but not more than twice; and said digital processor includes means for using the checksum to chose between two alternative line-scans for at least one of the plurality of patterns.

15. A device as in claim 11 wherein:

each of the a plurality of patterns represents one digit of a serial number corresponding to said negotiable instrument; and said digital processor electronically associates the negotiable instrument information printed by the printer upon said negotiable instrument with said serial number.

16. A device for issuing a negotiable instrument by automatically identifying a serial number marked on the negotiable instrument and associating the serial number with transaction information relating to the issuance of the negotiable instrument, said device comprising:

a printer that prints transaction information on the negotiable instrument, to thereby issue the negotiable instrument;

a plurality of preprinted patterns on the negotiable instrument, each one located at a different position upon the negotiable instrument relative to a predetermined path;

a radiation source positioned to shine radiation upon the plurality of patterns;

a radiation detector positioned to sequentially detect each one of the plurality of preprinted patterns, the radiation detector producing an electronic signal representing each pattern;

means for producing relative movement corresponding to the path between the negotiable instrument and the radiation source or the radiation detector; and a digital processor coupled to the radiation detector to receive the electronic signal, and also to the printer to control the issuance of the negotiable instrument, the digital processor tetecting the serial number from the electronic signal and associating the transaction information with the serial number.

* * * * *